May 6, 1930. O. GÜNTHER 1,756,978
DRIVING GEAR FOR LOCOMOTIVES
Filed Oct. 16, 1926 4 Sheets-Sheet 1
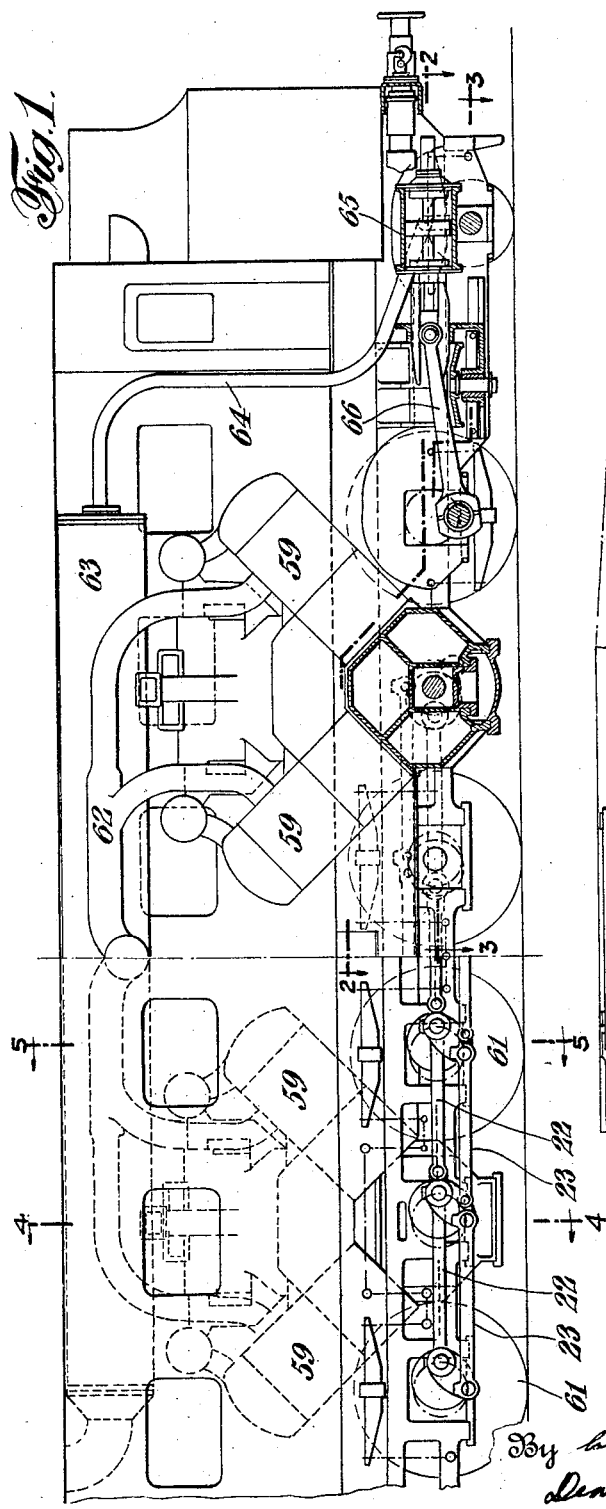

May 6, 1930. O. GÜNTHER 1,756,978
DRIVING GEAR FOR LOCOMOTIVES
Filed Oct. 16, 1926 4 Sheets-Sheet 2
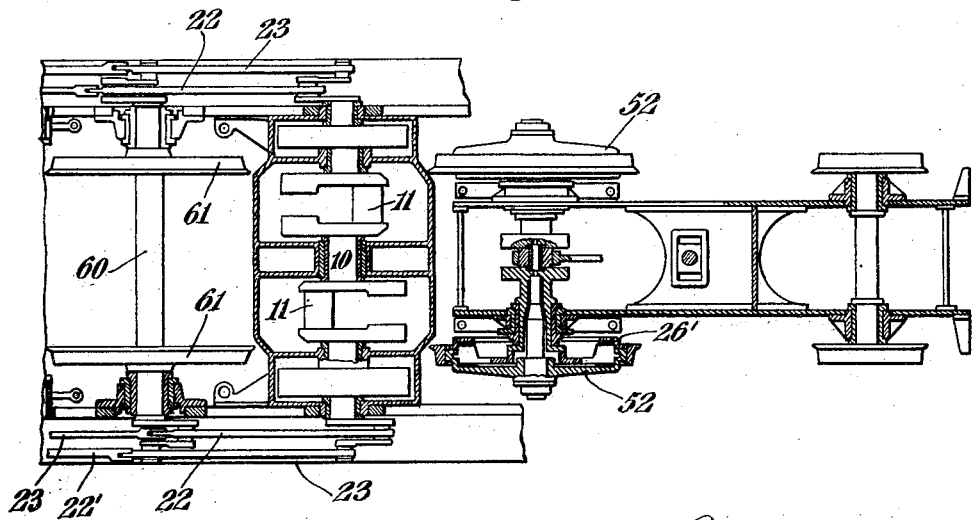
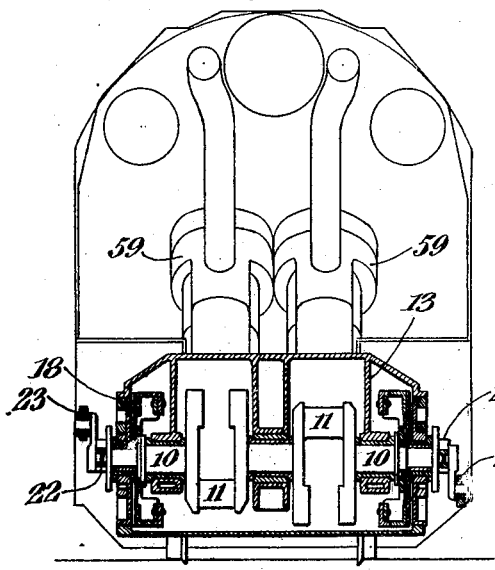
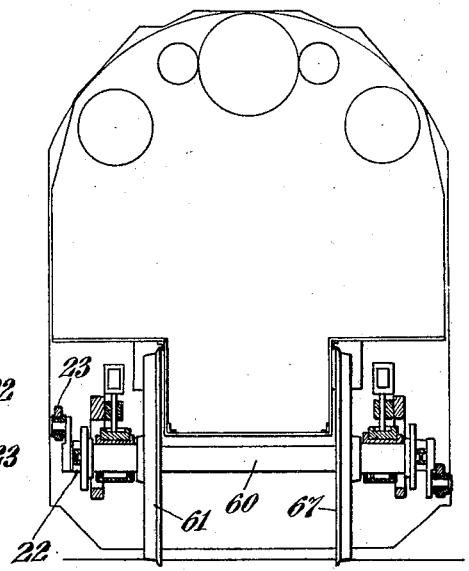
Inventor
Otto Günther
By his Attorneys May 6, 1930.  O. GÜNTHER  1,756,978
DRIVING GEAR FOR LOCOMOTIVES
Filed Oct. 16, 1926   4 Sheets-Sheet 3

Inventor
Otto Günther
By his Attorneys

May 6, 1930.   O. GÜNTHER   1,756,978
DRIVING GEAR FOR LOCOMOTIVES
Filed Oct. 16, 1926   4 Sheets-Sheet 4
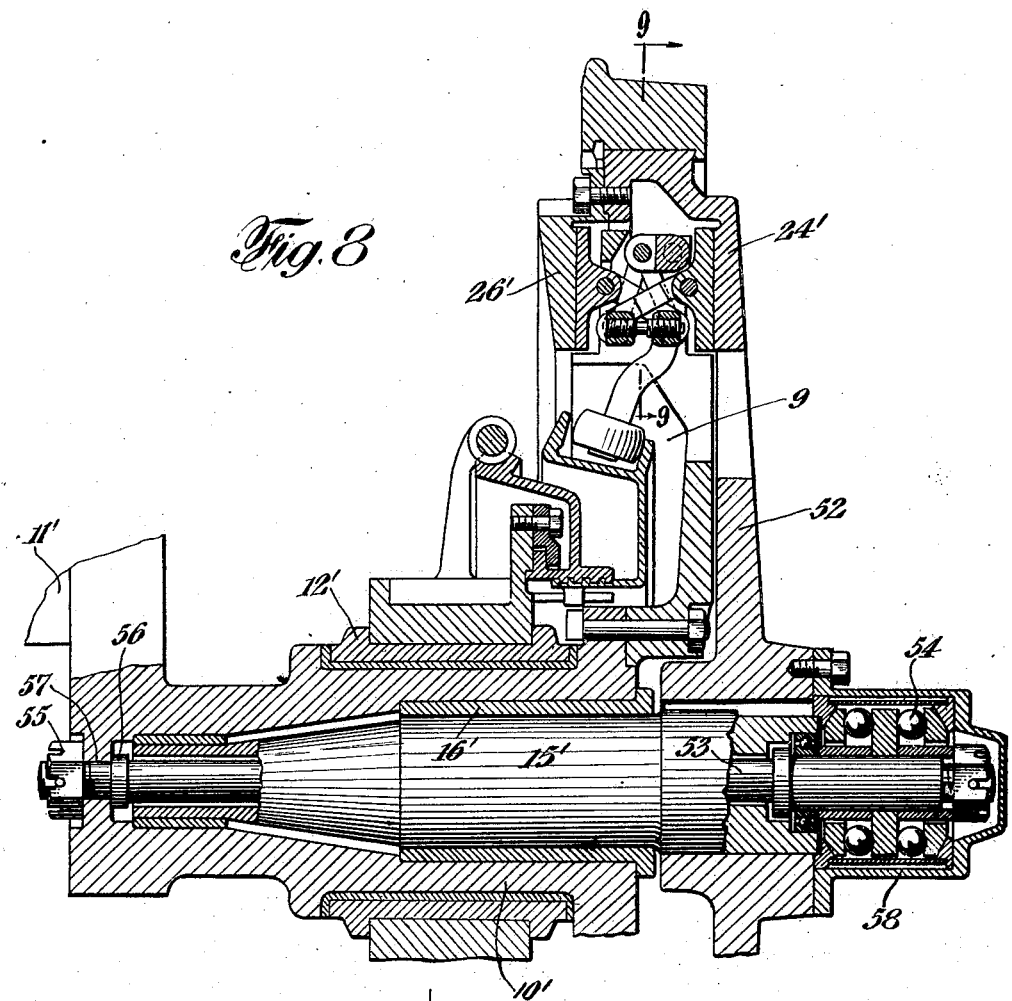
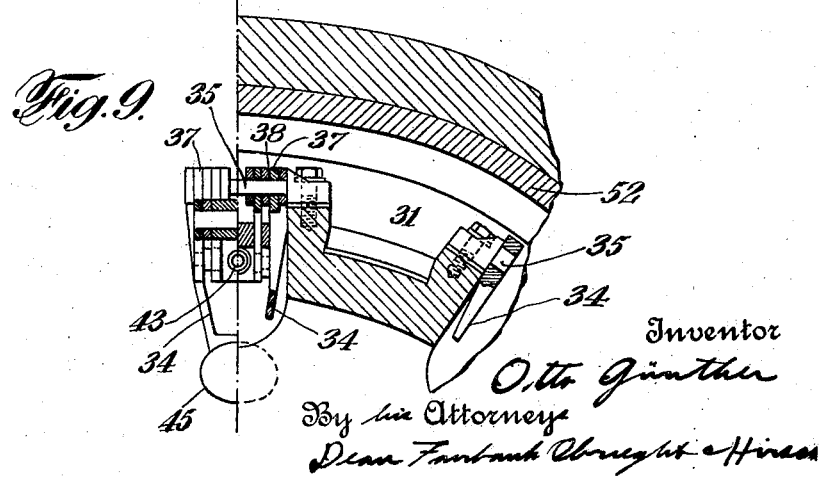
Inventor
Otto Günther
By his Attorneys
Dean Fairbank Albright & Hines Patented May 6, 1930

1,756,978

UNITED STATES PATENT OFFICE

OTTO GÜNTHER, OF ESSLINGEN-ON-THE-NECKAR, GERMANY, ASSIGNOR TO ALBERT T. OTTO & SONS, OF NEW YORK, N. Y., A CORPORATION OF NEW YORK

DRIVING GEAR FOR LOCOMOTIVES

Application filed October 16, 1926, Serial No. 142,031, and in Germany October 28, 1925.

This invention has for its main object the provision of improved means for connecting a driving and a driven member, and more particularly the provision of an improved friction clutch for connecting an internal combustion engine to the tractions wheels of a locomotive.

One object of the invention is to provide a friction clutch capable of transmitting the required power in a motor driven locomotive, and capable of withstanding the heavy demands imposed on it.

As one important feature there is provided means whereby high friction pressure may be produced, and slipping, with corresponding generation of heat, prevented.

As another important feature, and in order to secure the desired compactness and strength, the driven member, for instance the locomotive axle, is mounted within or partly within the driving member, for instance the Diesel engine crank shaft. Thus the frame or crank case bearings of the crank shaft serve in part for carrying the load on the locomotive axle.

The axle may have a traction wheel attached directly thereto in which case the wheel is so designed as to form a part of or be directly attached to the driven element of the clutch; or the crank shaft may be connected to the axle through a crank, in which case the crank may be directly connected to the axle and the latter provided with a wheel or rotor forming the driven part of the clutch.

By means of the improved construction separate clutches may be provided symmetrically on each side of the motor in direct driving relationship to the two aligned axle sections, whereby the power of the motor is equally distributed to traction wheels on opposite sides of the locomotive.

As another important feature of the improved clutch, the driving and driven elements of the clutch are so designed that one is housed within the other, and the inner element has clutch shoes or members which are relatively movable axially into and out of gripping engagement with opposed and spaced clutch faces of the outer element.

As another feature there is provided an operating member mounted for axial movement by worm and gear wheel, and engaging a roller on a bell crank lever, the latter being connected to the relatively movable elements of the clutch for effecting the gripping or releasing action. The bell crank is preferably so designed and disposed that centrifugal force tends to increase the friction pressure during operation.

Other objects of the invention and other advantages of certain preferred forms will be pointed out hereinafter, or will be apparent from the drawing and description of the parts and their operation.

In the accompanying drawings:

Fig. 1 is a side elevation of a locomotive provided with the improved driving mechanism, a portion being shown in central longitudinal section indicated by the line 1—1 of Fig. 2.

Figs. 2 and 3 are horizontal sections on the lines 2—2 and 3—3 respectively of Fig. 1.

Figs 4 and 5 are vertical sections on the lines 4—4 and 5—5 respectively of Fig. 1.

Fig. 8 is a section through a construction having the clutch in the locomotive drive wheel, and Fig. 9 is a sectional detail on the line 9—9 of Fig. 8.

Figure 6:
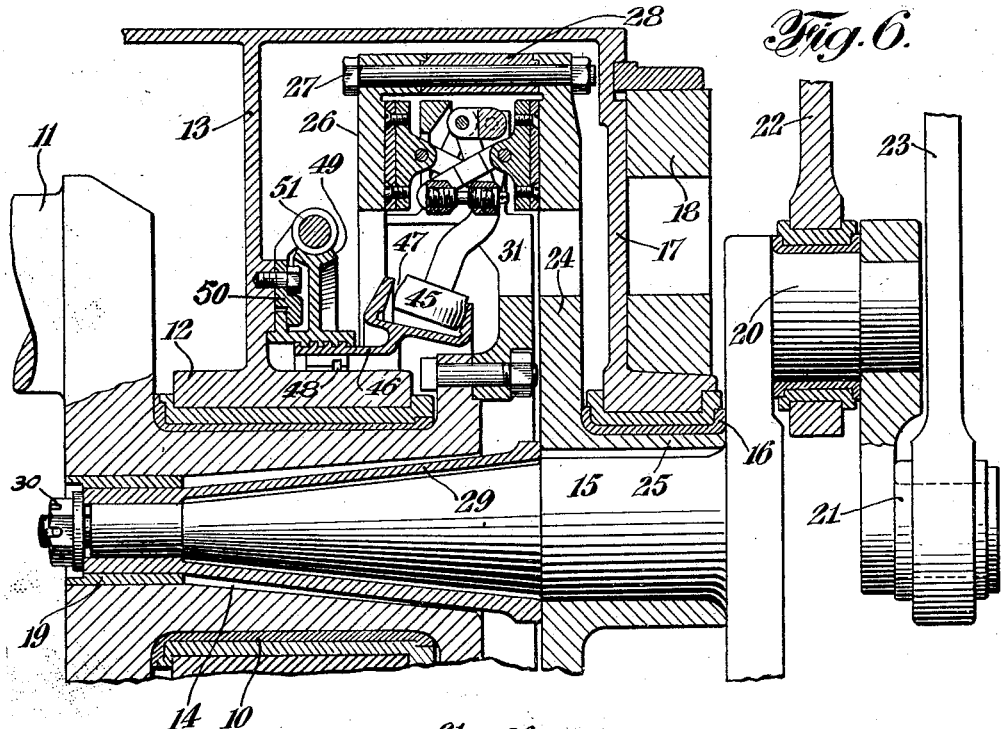
Fig. 6 is a horizontal section through the driving mechanism and showing on larger scale parts illustrated somewhat diagrammatically in Fig. 4.
Figure 7:
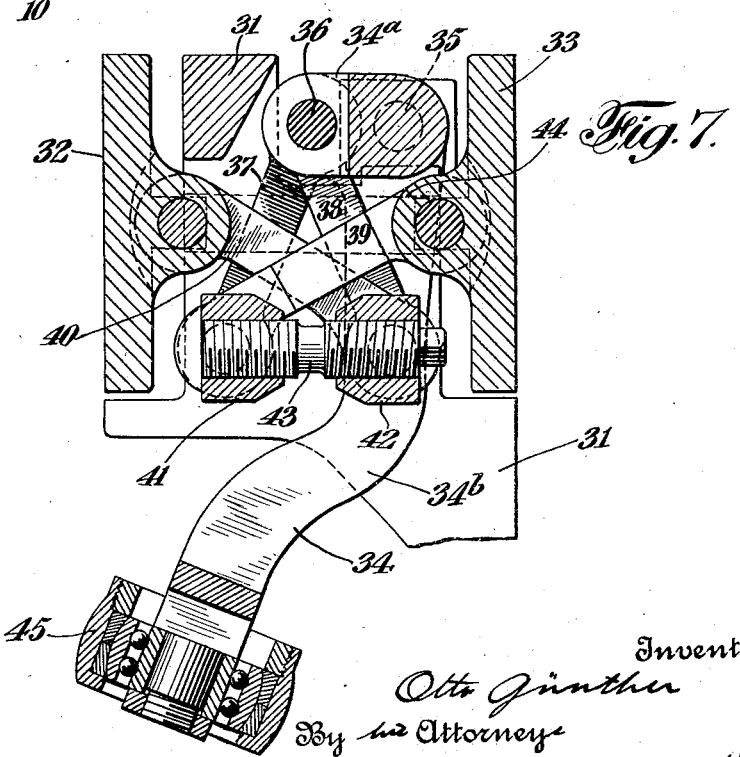
Fig. 7 is a view similar to a portion of Fig. 6, but on a still larger scale.

Referring particularly to Figs. 6 and 7, there is illustrated a drive mechanism for connecting an engine crank shaft to a driven shaft which latter has double crank connections to the traction wheel. The driving member is in the form of a Diesel motor crank shaft 10 having a main crank 11. The crank shaft is mounted in a suitable bearing 12 in the crank case 13. The shaft section of the crank shaft is made hollow or provided with an axial bore 14 within which is disposed the end portion of the driven shaft 15. This driven shaft is mounted in a bearing 16 in an extension 17 of the crank case which is directly connected to the side frame 18 of the locomotive. The driven shaft is tapered and at its inner end is mounted in a bearing 19 within the crank shaft 10.

The driven shaft may in some cases be directly connected to the traction wheel of the locomotive as hereinbefore pointed out more in detail, but in the specific form shown in Figs. 6 and 7 the driven shaft is provided with a double crank with crank pins 20 and 21 on which are journaled driving rods 22 and 23 for transmitting power to the traction wheel from the driven shaft 15.

The driven shaft 15 is connected to the crank shaft 10 by a friction clutch and by reason of the mounting of the driven shaft within the crank shaft the clutch is mounted so as to encircle a portion of the crank shaft, and a very compact construction is thereby secured.

The driven element of the clutch is illustrated as a wheel including a plate member 24 which may be provided with a sleeve 25 keyed to the portion of the driven shaft within the bearing 16 so as to form an outer bearing sleeve for the driven shaft. This plate 24 is connected to a second plate 26 which is parallel thereto and spaced therefrom. The plate 26 may be an annular inwardly extending flange, and the two plates 24 and 26 present the opposed faces which constitute the clutch faces of the driven member. The two plates may be connected together in any suitable manner, as for instance by bolts 27 and spacers 28.

The plate 24 and its sleeve 25, of the driven wheel, may be held against any endwise movement in respect to the driven shaft by means of a sleeve 29 encircling the portion of the driven shaft within the crank shaft and having one end abutting against the end of the sleeve 25, and the other end held in place by a nut 30. A portion of this sleeve may present the bearing surface of the driven shaft within the bearing 19.

The driving member of the clutch includes a spider 31 carrying opposed relatively movable clutch elements or shoes 32 and 33 adapted to be spread apart and engage the plates 24 and 26 which form the clutch elements of the driven member. The annular clutch elements 32 and 33 are operated by toggle links and a bell crank lever, so as to be moved simultaneously in opposite directions and at the same time be free to float so as to engage with the driven member with equal pressure.

A bell crank lever 34, preferably of bifurcated form, is mounted on a pin 35 carried by the spider, and each branch of the bell crank lever has a substantially axially extending lever arm 34$^a$ and an arm 34$^b$ extending inwardly with its main component radial to the clutch. The arms 34$^a$ of the bell crank lever carry a pin 36 on which are suspended a pair of links 37 and 38. These are connected at their lower ends by links 39 and 40 to the friction shoes 32 and 33. The link 38 is pivotally connected to the link 40 and the latter to the shoe 32, while the link 37 is connected to the link 39 and the latter to the shoe 33.

The connecting pins between the two links of each set are preferably held rigid in respect to each other and in spaced relationship. As shown, the two pins have heads 41 and 42 through which extends an adjusting bolt 43. This may have right and left hand thread connections with the heads 41 and 42 so that the latter may be adjusted toward and from each other to regulate the normal position of the friction shoes in respect to the plates 24 and 26. The friction shoes are guided axially and held against radial movement in any suitable manner. For instance the pivot pins which connect the links 39 and 40 to the friction shoes may have portions guided in an axially extending slot 44 in the spider.

By swinging the bell crank lever the pin 36 is raised or lowered and by raising movement the lower ends of the links 39 and 40 are likewise raised, and as these ends cannot spread apart the friction shoes are forced apart into engagement with the driven member. The friction shoes may be provided with any suitable form of liners to give the desired frictional contact with the driven element, said liners being removable so that they may be replaced when worn. These are shown as attached to the friction shoes in Fig. 6, but are omitted from Fig. 7.

The inner end of the bell crank lever is provided with a roller 45 for engagement with an actuating member. This member is shown as a sleeve 46 encircling the bearing of the crank shaft and provided with flanges forming an annular groove 47 receiving the roller so that as the sleeve 46 is moved axially the lever is caused to swing and the clutch is brought into or out of operation. The sleeve 46 is held against rotation by means of any suitable form of key as for instance a pin 48 engaging a groove in the inner surface of the member, but is free to move axially. The outer surface of the sleeve has screw threaded engagement with a worm wheel 49 which is held to the crank case by brackets 50. The worm wheel engages with a worm 51. By rotating the worm 51 the worm wheel is caused to rotate and the sleeve 46 is moved axially to swing the bell crank lever.

The bell crank lever preferably has an axial component, whereby centrifugal force acting on the roller 45 tends to swing the lever in such a direction as to engage the clutch. The roller preferably has a limited lost motion in the groove 47 so that when the roller is forced to the position to engage the clutch the action of centrifugal force may, at high speed, tend to increase the gripping action of the clutch elements.

In Figs. 8 and 9 there is illustrated a construction very similar to that hereinbefore described, so far as concerns the details of the clutch, but the driven shaft is directly rather than indirectly connected to the traction wheel of the locomotive. The engine crank shaft 10' has an axial bore within which is mounted the driven shaft 15. The main bearing 16' for the driven shaft is within the bore of the crank shaft and encircled by the main bearing 12' of the crank shaft. The traction wheel 52 is keyed to the outer end portion of the driven shaft and directly serves as the driven member of the clutch. The web of the traction wheel serves as one plate 24' and has bolted thereto the other clutch plate 26'. The driving member of the clutch may be constructed substantially as hereinbefore described. The crank shaft is held against axial movement in the main bearing 12' and the driven shaft is held against axial movement in the crank shaft preferably by means of a bolt 53, which may be provided with a thrust bearing 54 on its outer end, where it is connected to the traction wheel 52. The bolt 53 at its inner end may be locked to the crank shaft by a lock nut 55 and collar 56 engaging upon opposite sides of a wall 57. The thrust bearing is protected by a casing 58 which may be secured directly to the hub of the wheel 52.

In Figs. 1 to 5 inclusive there is illustrated a locomotive embodying my invention. The crank shaft 10 preferably has two of the cranks 11 which are connected in the usual manner to the pistons of an engine which may include four cylinders 59 arranged in two V-pairs. The rods 22 and 23 at opposite sides of the locomotive may be connected to cranks on an axle 60 which has traction wheels 61. There may be two or more of these engines, and all of the traction wheels driven by the engines connected up by additional connecting rods 22 and 23.

The exhaust from the engines may be delivered through conduits 62 to a manifold 63 and from the latter through a conduit 64 to the opposite ends of an exhaust cylinder 65. This may have its connecting rod 66 secured to the crank 11' of the shaft 10' shown in Fig. 8.

By using clutches on opposite sides of the engine the power of the engine is distributed evenly to the traction wheels on the two rails. The pressure from the rollers, which has a horizontal effect, is transmitted at each clutch disk to the engine shaft. As the rollers are pressed in opposite directions on the two clutches this roller pressure is balanced. The entire power of the engine is distributed equally to the opposite sides and gives the same rotational power on each side. The action of centrifugal force on the bell crank replaces roller pressure upon increased speed of the engine, and the lost motion may even be such that the clutch automatically comes into operation by the automatic movement of the bell crank levers when the engine acquires a predetermined speed. Instead of connecting the wheel forming the driven member of the clutch to the traction wheels by connecting rods or by making the driven wheel a traction wheel of the locomotive, it may in some cases be formed as a gear wheel or may have a toothed rim whereby the power from the driven member may be transmitted in other ways. By reason of the mounting of the driven shaft sections in the end portions of the crank shaft, space is economized and large and powerful clutches may be used on both sides of the engine and inside of the traction wheels.

Having thus described the invention, what I claim as new and desire to secure by Letters Patent is:—

1. A locomotive driving gear, including a motor crank shaft having end shaft sections and an intermediate crank section, said shaft sections having axial bores, separate driven shafts journaled in said bores, and separate friction clutches for connecting said shaft sections and said driven shafts.

2. A locomotive driving gear, including a motor crank shaft having an axial bore, a supporting bearing for said crank shaft, a driven shaft having a supporting bearing within said bore, a friction clutch for connecting said shafts, and an annular clutch operating member encircling said first mentioned bearing.

3. A locomotive driving gear, including a motor crank shaft having an axial bore and means for transmitting power from said crank shaft to the traction wheels of the locomotive, including a driven shaft concentric with said crank shaft and projecting into the bore thereof, a clutch member secured to said driven shaft and having a pair of relatively fixed opposed clutch elements, a clutch member secured to said crank shaft and having a pair of relatively movable clutch elements disposed between the first mentioned elements, and an annular member encircling said crank shaft for effecting a relative axial movement of the elements of the second mentioned pair to engage the elements of the first mentioned pair.

4. In combination a crank shaft having an axial bore, a bearing for said crank shaft, a driven shaft rotatably mounted in said bore, a wheel secured to said driven shaft and having a pair of axially spaced clutch faces encircling said bearing, and a clutch member secured to said crank shaft and having axially movable clutch elements for engagements with said clutch faces.

5. In combination a crank shaft having an axial bore, a bearing for said crank shaft, a driven shaft rotatably mounted in said bore, a wheel secured to said driven shaft and having a pair of axially spaced clutch faces encircling said bearing, a clutch member secured to said crank shaft and having axially movable clutch elements for engagement with said clutch faces, and an axially movable non-rotatable member also encircling said bearing for actuating said clutch elements.

6. In combination a crank shaft having an axial bore, a bearing for said crank shaft, a driven shaft rotatably mounted in said bore, a wheel secured to said driven shaft and having a pair of axially spaced clutch faces, a clutch member secured to said crank shaft and having axially movable clutch elements for engagement with said clutch faces, and a bell crank lever for actuating said elements, said lever being so positioned that the action of centrifugal force thereon tends to swing the lever to more effectively engage the clutch.

7. A locomotive driving gear, including a motor crank shaft having an axial bore, a driven shaft journaled in said bore, a traction wheel secured to said driven shaft, and a friction clutch for coupling said traction wheel and said crank shaft.

8. A locomotive driving gear, including a motor crank shaft having an axial bore, a driven shaft journaled in said bore, a traction wheel secured to said driven shaft, and having a pair of clutch faces axially spaced upon opposite sides of the tread thereof, and a clutch member secured to said crank shaft and adapted to be expanded to grip said faces.

9. A locomotive driving gear including a motor crank shaft having an axial bore, a supporting bearing for said crank shaft, a driven shaft having a supporting bearing within said bore and encircled by said first mentioned supporting bearing, a friction clutch having spaced opposed relatively fixed clutch faces connected to said driven shaft, and opposed relatively movable clutch faces disposed between the first mentioned faces and connected to said crank shaft.

OTTO GÜNTHER.